July 6, 1971  R. C. SNYDER  3,591,435
METHOD OF PRODUCING DECORATIVE FIBER GLASS TUBING
Filed July 7, 1969

INVENTOR
RICHARD C. SNYDER
BY
Salvatore G. Militana,
ATTORNEY

United States Patent Office 3,591,435
Patented July 6, 1971

3,591,435
METHOD OF PRODUCING DECORATIVE FIBER GLASS TUBING
Richard C. Snyder, Coral Gables, Fla., assignor to Gatorglass Manufacturing Co., Inc., Hialeah, Fla.
Filed July 7, 1969, Ser. No. 839,599
Int. Cl. B65h 81/02
U.S. Cl. 156—187          2 Claims

ABSTRACT OF THE DISCLOSURE

The method of producing a decorative fiber glass tubing by wrapping a pair of different colored fiber glass sheets impregnated with thermosetting plastic and subjecting it to pressure whereby the wrapped tubing is reduced by 30% and the wrapping becomes wrinkled about its periphery. Then after becoming set, the outer surface of the wrapping is cut or ground to any desired depth whereby designs of decorative patterns are effected thereon.

---

This invention relates to the method producing plastic tubing and is more particularly directed to the method of producing random decorative fiber glass tubing.

A principal object of the present invention is to provide a method of producing decorative fiber glass tubing whose designs are random and varied as well as being attractive and desirable.

Another object of the present invention is to provide a method of producing decorative fiber glass tubing that is simple, relatively inexpensive and unique in design so that no tubing have the same or identical designs.

A further object of the present invention is to provide a method of producing decorative fiber glass tubing that requires no artistic skill on the part of the operator as well as no special equipment to produce tubing on whose outer surface are attractive designs.

With these and other objects in views, the invention will be best understood from a consideration of the following detailed description taken in connection with the accompanying drawing forming a part of this specification with the understanding, however, that the invention is not confined to any strict conformity with the showing of the drawing but may be changed or modified so long as such changes or modifications mark no material departure from the salient features of the invention as expressed in the appended claims.

Figure 1:
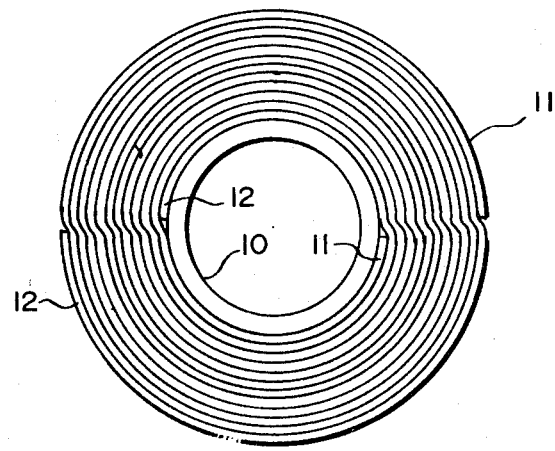
FIG. 1 is a cross sectional view of a tubing on which fiber glass cloth has been wrapped as the first step of my method.

Referring to the drawing wherein like numeral are used to designate similar parts throughout the several views the numeral 10 refers to a length of tubing forming the base upon which sheet fiber glass 11 is wrapped as shown by FIG. 1. The tubing 10 may be hollow or solid, cylindrical in cross section or have any desired shape as determined by the finished article. In this instance, the tubing 10 is hollow and the completed article 20 is intended to be used as the handle or grip of a fishing rod.

Figure 2:
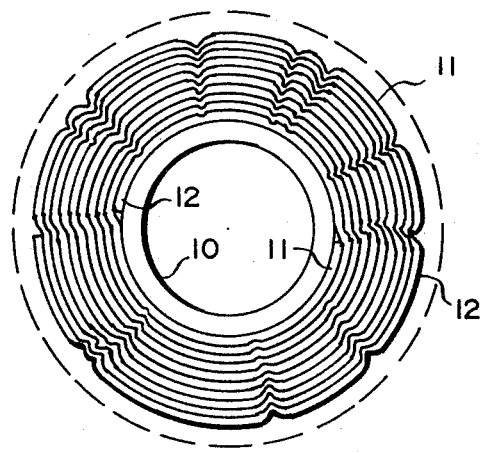
FIG. 2 is a similar view after having subjected the wrapping to compressive pressures, the dotted line indicating the position of the outermost layer of wrapping.

As a first step in my method of producing a decorative fiber glass tubing of random design, a plurality of lengths of sheet fiber glass 11 and 12 is wound around the tubing 10, the fiber glass 11, 12 being of different color or/and texture and impregnated with a thermosetting plastic. Then the fiber glass 11, 12 are subjected to pressure, either pneumatic or mechanical pressure. One method of applying pressure to the wrapping 11 is by winding a tape tightly around the wrapping 11, 12 so as to compress the fiber glass wrapping and reduce the diameter of the article by as much as 30%, as shown by FIG. 2. The entire fiber glass wrapping will become wrinkled and uneven, and on the outer surface there will appear longitudinally extending hills and crests in wavy and uneven lines along the length of the tubing 10.

Then the thermosetting plastic is made to become set and hardened. If a catalyst has been used with the plastic, the setting process is effected automatically. If heat is required, upon application of heat to the plastic impregnated fiber glass the plastic becomes set and is then ready for the next step of my method.

Figure 4:
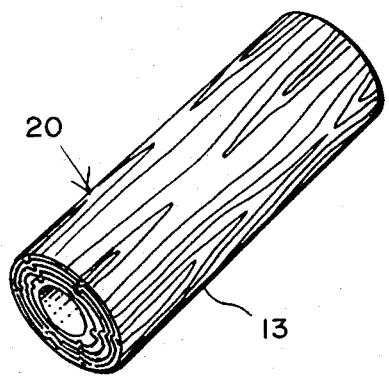
FIG. 4 is a perspective view of the completed decorative fiber glass tubing.
Figure 3:
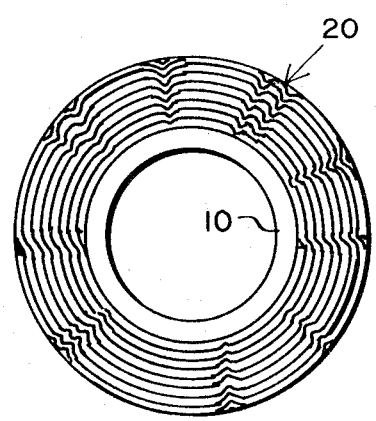
FIG. 3 is a similar view after the tubing has been milled.

After the plastic has been set, the tubing 10 is then placed on a lathe or milling machine and the outer surface is ground or shaved until a smooth and even surface 13 is obtained on the finished tub ing 20 with the random design of the different colored fiber glass exposed as shown by FIG. 4. As different depths are reached by cutting the surface on the lathe, different random designs are effected as illustrated by FIG. 3. The designs received by this process is determined by the shape taken by the different colored fiber glass upon subjecting them to a high pressure and compressing the rolls of fiber glass. The greater the number of hills and valleys formed during the compression process, the greater percentage of the exposed surface of fiber glass will be covered with designs. Also, by using more than two layers of different colored sheet fiber glass, the designs will be even more varied, than when using ony two different color layers of fiber glass 11 and 12. It is be noted that the amount of designs can be controlled by the amount of wrinkling of the fiber glas effected during the compression process as well as by the depth of cut made during the milling or lathe grinding process. However, the particular design received by this process is random resembling decorative wood grain, longitudinal and wavy lines of varying widths and the like.

Having disclosed my invention, what I claim as new and desire to secure by Letters Patent of the United States is:

1. A method of producing decorative fiber glass tubing comprising a length of tubing, wrapping a plurality of varied colored sheets of fiber glass one upon the other about said tubing, said sheets of fiber glass being impregnated with thermosetting plastic, subjecting said fiber glass wrapping to pressure whereby reducing the diameter of said wrapping and effecting a plurality of wrinkles about the periphery thereof and machining the outer surface of said wrapping to a desired depth whereby the exposed varied colored fiber glass sheets forms a decorative pattern thereon.

2. The structure as recited by claim 1 wherein said pressure reduces the overall diameter of said wrapped tubing by substantially 30 percent.

References Cited

UNITED STATES PATENTS

| | | | |
|---|---|---|---|
| 2,169,930 | 8/1939 | Schuster | 156—187 |
| 2,290,935 | 7/1942 | Bacon | 156—185 |
| 2,607,494 | 8/1952 | Valente et al. | 156—187X |
| 2,666,005 | 1/1954 | Norehad | 156—185X |
| 3,055,785 | 9/1962 | Clauson et al. | 156—194X |
| 3,463,689 | 8/1969 | Palmai | 156—190 |
| 3,520,747 | 7/1970 | McGaughey | 156—187X |

LELAND A. SEBASTIAN, Primary Examiner

G. G. SOLYST, Assistant Examiner

U.S. Cl. X.R.

156—191, 194